United States Patent [19]

Oberle et al.

[11] Patent Number: 4,469,742

[45] Date of Patent: Sep. 4, 1984

[54] PASTEURIZABLE, COOK-IN SHRINK FILM

[75] Inventors: Timothy T. Oberle, Lyman; Henry G. Schirmer; Norman D. Bornstein, both of Spartanburg; Johnnie J. Walters, Greer, all of S.C.

[73] Assignee: W. R. Grace & Co., Cryovac Div., Duncan, S.C.

[21] Appl. No.: 461,638

[22] Filed: Jan. 31, 1983

[51] Int. Cl.$^3$ .................. B32B 7/02; B65D 85/72; B65D 65/40
[52] U.S. Cl. .................................. 428/215; 428/35; 428/347; 428/516; 428/520; 428/910; 264/176 R; 264/22; 206/524.2; 206/484; 206/484.2; 426/127; 426/113
[58] Field of Search ............. 428/347, 516, 910, 215, 428/520

[56] References Cited

U.S. PATENT DOCUMENTS 4,370,388 1/1983 Mito et al. ............... 428/516 X
4,391,862 7/1983 Bornstein et al. .......... 428/516 X
4,407,873 10/1983 Christensen .............. 428/516 X Primary Examiner—Patricia C. Ives
Attorney, Agent, or Firm—John J. Toney; William D. Lee, Jr.; Joseph P. Harps

[57] ABSTRACT

A pasteurizable and/or cook-in shrink film is provided that includes a first or sealing layer of a nonlipophillic polymeric material having a softening point greater than that of the following shrink layer; a second or shrink controlling layer, melt bonded to the first layer, of an ethylene homopolymer or copolymer; a third or adhesive layer, melt bonded to the second layer, of a chemically modified polyethylene being irradiatively cross-linkable and having functional groups with a relatively strong affinity for the following barrier layer; a fourth or barrier layer, melt bonded to the third layer, of a hydrolyzed ethylene-vinyl acetate copolymer; a fifth or adhesive layer as in said third layer, melt bonded to the fourth layer; and a sixth or abuse layer, melt bonded to the fifth layer. An associated method for making the film is also provided that includes full coextrusion and selective irradiation and orientation.

13 Claims, No Drawings 4,469,742

PASTEURIZABLE, COOK-IN SHRINK FILM

BACKGROUND OF THE INVENTION

This invention relates generally to heat shrinkable, relatively gas impermeable, thermoplastic packaging film which can be heat sealed to itself to form a flexible package. The invention relates more particularly to bags of such film for food products in which the packaged product is submerged in heated water or autoclaved for a substantial period of time for pasteurizing or cooking, the bag structure being shrinkable and non-degradable under such conditions.

There is a need in the food packaging industry for a packaging film from which bags can be made which are of improved structural soundness such that they may be fully characterized as pasteurizable and/or cook-in. Further, it is desirable to have a precooked food product which is attractively packaged inside the film within which it was precooked.

The term "pasteurizable" as used herein is intended to refer to packaging material structurally capable of withstanding exposure to pasteurizing conditions while containing a food product. Many food products require pasteurization after they have been hermetically packaged to destroy harmful microbes which grow in the absence of air. Specific pasteurization requirements tend to vary by country; however, limiting conditions probably are submersion of the hermetically sealed product in water at 95° C. for 1 hour. Thus, for a bag to be characterized as pasteurizable, structural integrity of the bag must be maintained during pasteurization, i.e. the bag must have superior high temperature seal strength and must be delamination resistant under such time-temperature conditions. Additionally, the packaging material should be heat shrinkable under pasteurizing conditions so as to provide an attractively packaged pasteurized food product.

The term "cook-in" as used herein is intended to refer to packaging material structurally capable of withstanding exposure to cook-in time-temperature conditions while containing a food product. Cook-in packaged foods are essentially pre-packaged, pre-cooked foods that go directly to the consumer in that configuration which may be consumed with or without warming. Cook-in time-temperature conditions typically refer to a long slow cook, for example submersion in water at 70°-80° C. for 4-6 hours. Such cook-in time-temperature requirements are representative of institutional cooking requirements. Submersion at 80° C. for 12 hours probably represents the limiting case. Under such conditions, a packaging material properly characterized as cook-in will maintain seal integrity and will be delamination resistant. Additionally, the packaging film should be heat shrinkable under these conditions so as to form a tightly fitting package and preferably should have some tendency for product adhesion to prevent "cook-out" or collection of juices between the surface of the food product and the interior surface of the packaging material.

Generalizing, there are a number of requirements for a pasteurizable, cook-in packaging material. It is the purpose of the present invention to provide a pasteurizable, cook-in packaging film meeting all of these requirements. First, bags made from such film must have seal integrity under such conditions, i.e. the heat sealed seams should resist being pulled apart during heat shrinking. As a corollary, the film should be heat sealable to itself. Second, such bags must be delamination resistant, i.e. the multilayers making up the film must not separate or blister. Third, the food contact layer of such film must qualify under the appropriate food laws and regulations for safe food contact. Fourth, the film must provide an oxygen and vapor barrier, i.e. must possess a low permeability to maintain the freshness of the food contained therein. Fifth, the film must be heat shrinkable in hot water under these time-temperature conditions, i.e. the film must possess sufficient shrink energy such that upon the packaged food product being submerged in hot water the packaging film will shrink snugly around the product contained therein, representatively about 30-50% biaxial shrinkage at about 90° C. Sixth, the film should possess optical clarity, i.e. the film should not become cloudy upon exposure to these time-temperature conditions so as to maintain eye appeal of the packaged product.

In general, such a multilayer film structure will have the minimal structure (sealing and food contact layer)/(shrink layer)/(barrier layer)/(abuse layer), a composite structure being required to achieve the desired composite properties of the packaging film.

A heat shrinkable, thermoplastic, barrier packaging film for making bags which has enjoyed considerable commercial success is described in U.S. Pat. No. 3,741,253 issued on June 26, 1973 to Brax et al, which relates to a multilayer film comprising a first outside layer of an irradiated ethylene-vinyl acetate copolymer, a core layer of vinylidene chloride copolymer, and a second outside layer of an ethylene-vinyl acetate copolymer. In manufacturing this type of heat shrinkable film, a tubular orientation process is utilized wherein a primary tube of the film is biaxially oriented by stretching with internal pressure in the transverse direction and with the use of pinch rolls at different speeds in the machine direction. Then the bubble is collapsed, and the film is wound up as flattened, seamless, tubular film to be used later to make bags, e.g. either end-seal bags typically made by transversely heat sealing across the width of flattened tubing followed by severing the tubing so that the transverse seal forms the bottom of a bag, or side-seal bags in which the transverse seals form the bag sides and one edge of the tubing forms the bag bottom.

This type of bag is typically used by placing the food product in the bag, evacuating the bag, gathering and applying a metal clip around the gathered mouth of the bag to form a hermetic seal, and then immersing the bag in a hot water bath at approximately the same temperature at which the film was stretch-oriented, typically about 160° to 205° F., hot water immersion being one of the quickest and most economical means of transferring sufficient heat to the film to shrink it uniformly. Alternatively, the bag may serve as a liner of a cooking mold. One problem which has been encountered is the failure of the bag seals at the bottom of the bags as the bag is shrunk around a product, the shrink forces tending to pull the seal apart.

Of general interest concerning the present invention, is the disclosure of U.S. Pat. No. 4,352,702 for "Method of Making a Thermoplastic Receptacle Having Improved High Temperature Seal" issued Oct. 5, 1982 to Bornstein, being directed to a pasteurizable shrink bag from tubular film having a layer of hydrolyzed ethylene-vinyl acetate copolymer and an interior surface layer of a polyolefin which is cross-linkable by ionizing radiation, with the layers being directly melt-joined without an adhesive disposed therebetween and the film being irradiatively cross-linked and oriented. A second irradiation treatment is carried out on receptacles made from the film to condition their heat seals for pasteurizing conditions.

Of general interest is the disclosure of U.S. Pat. No. 4,064,296 for "Heat Shrinkable Multilayer Film of Hydrolyzed Ethylene-Vinyl Acetate and a Cross-Linked Olefin Polymer" issued Dec. 20, 1977 to Bornstein et al, being directed to a coextruded tubular film having a layer of hydrolyzed ethylene-vinyl acetate copolymer layer between two other polymeric layers at least one of which being irradiatively cross-linkable, the film being irradiated and oriented.

Of general interest is the disclosure of U.S. Pat. No. 3,595,740 for "Hydrolyzed Ethylene-Vinyl Acetate Copolymer as Oxygen Barrier Layer" issued July 27, 1971 to Gerow, being directed to oxygen barrier films having an interior barrier layer of a melt extrudable hydrolyzed ethylene-vinyl acetate copolymer and a heat sealing layer of an ethylene polymer or copolymer.

Of general interest is the disclosure of U.S. Pat. No. 4,233,367 for "Coextruded Multilayer Film" issued Nov. 11, 1980 to Ticknor et al, being directed to a coextruded multilayer film having adhesive interlayers of a chemically modified polyolefin, such as Plexar (TM) adhesive, with functional groups selected for their strong affinity for nylon under heat and pressure conditions of coextrusion.

Of general interest is the disclosure of U.S. Pat. No. 4,276,330 for "Trilaminate Film For Forming Sideweld Bags" issued June 30, 1981 to Stanley et al, being directed to sideweld bags made from trilaminate film having a core layer of propylene-ethylene block copolymer between surface layers of propylene-ethylene random copolymer.

SUMMARY OF THE INVENTION

The present invention is directed to a multilayer film from which packaging bags can be made which maintain seal integrity, are delamination resistant, and are heat shrinkable during pasteurizing and/or cooking of a contained food product at a sustained elevated temperature in water or steam.

Accordingly, there is provided a pasteurizable and/or cook-in shrink film comprising a first or sealing layer which comprises a non-lipophillic polymeric material having a softening point greater than that of the following shrink layer; a second or shrink layer, melt bonded to said first layer, which comprises an ethylene homopolyer or copolymer, further provided that the thickness of said second layer is sufficient such that the shrink temperature of the entire multilayer film, when oriented, is substantially controlled by the shrink temperature of said second layer; a third or adhesive layer, melt bonded to said second layer, which comprises a chemically modified polyethylene being irradiatively cross-linkable and having functional groups with a relatively strong affinity for the following barrier layer; a fourth or barrier layer, melt bonded to said third layer, which comprises a hydryolyzed ethylene-vinyl acetate copolymer; a fifth or adhesive layer as in said third layer, melt bonded to said fourth layer; and a sixth or abuse layer, melt bonded to said fifth layer.

Additionally, there is provided a method for making a pasteurizable and/or cook-in shrink film comprising fully coextruding a tubular multilayer film having the foregoing composite structure, irradiating said tubular film sufficiently to cross-link the irradiatively cross-linkable layers of said film; and orienting said tubular film.

DESCRIPTION OF THE PREFERRED EMBODIMENTS

A representative embodiment of the invention is a composite tubular film having the multilayer structure (inside) A/B/C/D/C/E (outside) where A is primarily a heat sealing layer, B is primarily a shrink layer, C is primarily an adhesive layer, D is primarily a barrier layer, and E is primarily an abuse layer. A tubular film configuration is especially suited for bag making. The seal material of layer A is non-lipophillic, i.e. relatively resistant to degradation in the presence of grease, so that seal integrity of bags made from the film is maintained during cook-in conditions and has a softening point greater than that of the shrink layer B so that during heat shrinkage of a bag made from the film about a contained food product the bag seals are not softened. There are two general modes in selecting the sealing layer, the first being directed to a sealing material that does not cross-link in the presence of ionizing radiation, and the second being directed to a sealing material that undergoes adhering surface treatment in the presence of ionizing radiation to impart a tendency for adherence to a contained meat product during cook-in. In the first mode, the sealing layer is representatively a propylene-ethylene random copolymer having a minor amount of ethylene, representatively about 1–6%. In the second mode, the sealing material is an ionomer, representatively Surlyn (TM) from the DuPont Company. The second layer, being a shrink layer, is melt bonded to the first layer and is composed of an ethylene homopolymer or copolymer, representatively an ethylene-vinyl acetate having a vinyl acetate content of about 6–12% by weight. The term "shrink layer" is intended to refer to the shrink controlling layer that initiates compatible shrinkage of the overall multilayer structure. The relative thickness of the shrink layer is selected as being sufficient relative to that of the overall film thickness such that the shrink temperature of the shrink layer controls the shrinkage of the entire multilayer film, when oriented. Barrier layer D is composed of a hydrolyzed ethylene-vinyl acetate copolymer (EVOH) and, importantly, is not degraded during irradiative cross-linking of the tubular film. Adhesive interlayers C are melt bonded adjacent the barrier layer to provide delamination resistance of the barrier layer in the tubular film under pasteurizating or cook-in conditions. The adhesive is composed of a chemically modified polyethylene being irradiatively cross-linkable and having functional groups with a relatively strong affinity for the barrier material. Preferably, the adhesive is Plexar (TM) adhesive commercially available from the Chemplex Company. Abuse layer E isolates the barrier layer from adverse moisture contact and representatively is an ethylene-vinyl acetate copolymer having a vinyl acetate content of about 5–12%, preferably about 6%. All layers within the film are melt bonded to their respective adjacent layers by virtue of full coextrusion after which the entire multilayer film is subjected to ionizing radiation treatment. Representatively, the film will have an overall thickness prior to orientation of about 10–30 mils, seal layer A will have a thickness of about 2–6 mils, shrink layer B about 4–8 mils, adhesive layers C about 0.25-1 mil each, barrier layer D about 0.75-2 mils, and abuse layer E about 3-8 mils.

The tubular film of the invention can be made by a process similar to that described for the Brax patent, cited above, further provided that the tubular film is fully coextruded, i.e. all layers are simultaneously coextruded, using the conventional blown bubble technique. After cooling, the coextruded tube is flattened and then guided through an ionizing radiation field, for example through the beam of an electron accelerator to receive a radiation dosage in the range of about 3-12 megarads (MR). Irradiation by electrons to cross-link the molecules of polymeric material is conventional in the art. Radiation dosages are referred to herein in terms of the radiation unit "rad", with one million rads or a megarad being designated as "MR". The degree of molecular cross-linking is expressed in terms of the radiation dosage that induces the cross-linking. In general, irradiation should be sufficient to cross-link the irradiatively cross-linkable layers of the film to increase strength of the shrink layer without substantially diminishing elongation properties, and to provide delamination resistance of the film during pasteurizing or cook-in conditions. The tubular film is then cooled and collapsed after which it is fed into a hot water tank having water at about 190°-205° F. to soften the film for orientation; then it passes through pinch rolls and is inflated into a bubble and stretched to a point where the film thickness is representatively 2 mils. Suitable thickness will range from about 1-4 mils with a stretch ratio of about 8-15:1, which will impart a shrink capacity of about 30-55% biaxial free shrinkage at 185° F. (by ASTM D2732). As the bubble emerges from the hot water tank it cools rapidly in the air and then is collapsed and rolled up into flattened tubing. It is from this tubing of this final oriented thickness that bags are made as discussed above.

Since the barrier layer of EVOH is not degraded during radiation treatment of the entire multilayer film, the film may be fully or simultaneously coextruded. Full coextrusion is advantageous in that all layers of the multilayer film are directly melt joined for enhanced interlayer strength under pasteurizing or cook-in conditions.

In use, bags are made from the film of the invention in conventional manner, as discussed above, to form either end-seal or side-seal bags. Eventually, the bags are loaded with a food product, vacuumized and sealed, and subjected to pasteurizing or cook-in treatment in near boiling water. During this food treatment, bags maintain good seal integrity, do not delaminate, and heat shrink to form a neatly packaged pretreated food product.

In one preferred embodiment of the invention, the sealing layer is composed of a propylene-ethylene random copolymer (PER) which does not cross-link or observably degrade or consequently lose its sealing properties when irradiated with electrons during radiation treatment of the fully coextruded tubular film. It is essential that the propylene-ethylene copolymer of the sealing layer be a random copolymer. The term "random copolymer" is used in the conventional sense to refer to a copolymer consisting of alternating segments of two monomeric units of random lengths, including single molecules. The purpose of this limitation is that the sealing range of polypropylene is broadened to overlap the working temperature range of the shrink layer, but at the same time does not create a tendency of the propylene copolymer to cross-link in the presence of radiation which would unacceptably increase the viscosity of the sealing layer material during sealing and hinder formation of a completely fused seal. Another way of viewing this effect, is that as the randomness of the propylene-ethylene copolymer increases, crystallinity decreases thereby broadening the melt range for the random copolymer. Thus, in general the minor amount of ethylene added to randomize the copolymer will range from a lower ethylene content that is sufficient to disrupt crystallinity to the extend that the melt range of the random copolymer is sufficiently broadened to encompass ranges somewhat below that of boiling water, while the upper limit for the ethylene content is limited by the extent of randomness desired in that as ethylene content increases copolymerization will become generally less random and more of the block type, the block configuration tending to promote crystallinity (block alignment) and cross-linking in irradiation fields. Commercially available propylene-ethylene random copolymers are generally available with ethylene contents of about 1-6% and may be available up to 10% to a lesser extent. A representative random copolymer within the scope of the invention may be typically characterized as having a randomness index of roughly 0.5, as determined by the methodology disclosed in U.S. Pat. No. 4,325,365, a bulk density at 23° C. of about 0.9 grams/cc by ASTM D 1895-69 method C, a melt flow at 190° C. of about 1.7 grams/10 minutes by ASTM D1238, an ethylene content of about 5% by Perkin-Elmer infrared spectrophotometer standards, and a melting temperature of about 136° C.

In another mode, when adhesion of the the inner surface of a bag made from the film of the invention to a contained food product during cook-in is desired, the material of the sealing layer is an ionomer that is responsive to an energetic adhering surface treatment such as exposure to ionizing radiation. Representatively, such a material is available from DuPont under the trademark Surlyn which refers to metal salt neutralized copolymers of ethylene and acrylic acid or methacrylic acid. In certain applications, it is advantageous that a cook-in package adhere to the contained food product to prevent cook-out, i.e. exudation of fluids from the food product during cooking. By restricting exudation of fluids from a cook-in contained food product, the yield of the precooked food product is increased by fluid retention. In this mode, when the multilayer film is subjected to radiation treatment for cross-linking, the inner surface of the Surlyn layer is consequently given an adhering surface treatment. The inclusion of Surlyn in the multilayer film may limit service use to cook-in conditions.

The second or shrink layer is an ethylene homopolymer or copolymer such as low density polyethylene, ethylene-vinyl acetate copolymer, or ethylene-methylacrylate copolymer. Preferably, the shrink layer is composed of EVA having a vinyl acetate content in a range of about 6-12%, most preferably about 6%, with the orientation temperature generally decreasing and shrink capacity increasing as the vinyl acetate content is increased. However, the melt temperature of EVA tends to decrease as vinyl acetate content increases so that a content of about 12% is limiting with a melting temperature of about 95° C. for pasteurizing applications. Irradiative cross-linking corresponding to a dosage of about .3-12 MR provides sufficient cross-linking in the shrink layer to enable production of the tubular film and orienting by the blown bubble technique at economic production rates.

The barrier layer is composed of hydrolyzed ethylene-vinyl acetate copolymer, preferably hydrolized to at least about 50%, most preferably to greater than about 99%. The mole percent of vinyl acetate prior to hydrolysis should be at least about 29% since for lesser amounts the effectiveness of the hydrolyzed copolymer as a gas barrier is substantially diminished. It is further preferred that the EVOH copolymer have a melt flow being generally compatible with that of the other components of the multilayer film, preferably in the range of 3–20, more preferably in the range of about 3–10 (melt flow being determined generally in accordance with ASTM D1238). The gas of main concern is oxygen and transmission is considered to be sufficiently low, i.e. the material is relatively gas impermeable, when the transmission rate is below 70 cc/m$^2$/mil thickness/24 hrs./atms, as measured according to the procedures of ASTM Method D-1434. The multilayer film of the present invention has a transmission rate below this value. EVOH is advantageously utilized in the film of the invention since irradiative treatment of the fully coextruded film does not degrade the barrier layer, as would be the case for a vinylidene chloride-vinyl chloride copolymer (saran) barrier.

The adhesive interlayers melt bonded adjacent the barrier layer are composed generally of a chemically modified polyethylene being irradiatively cross-linkable and being chemically modified by the provision of functional groups having a strong affinity for the EVOH copolymer of the barrier layer and which will form a strong bond under the heat and pressure of coextrusion. Preferably, the adhesion is Plexar (TM) commercially available from the Chemplex Company. Plexar variants are described in U.S. Pat. Nos. 4,087,587 and 4,087,588. Plexar-2 adhesive may be generally characterized as an adhesive of the type comprising blends of a graft copolymer of a high density polyethylene and at least one unsaturated, fused ring, carboxylic acid anhydride, blended with one or more resin copolymers of ethylene and an ethylenically unsaturated ester. Plexar-3 is preferred which comprises blends of a graft copolymer of a high density polyethylene and at least one unsaturated fused ring carboxylic acid anhydride, blended with a polyethylene resin of one or more homopolymers of ethylene, copolymers of ethylene and an alpha-olefin or any or all of these. Another suitable adhesive is Admer LF500 (TM) commercially available from the Mitsui Company which comprises a low density polyethylene modified with thallic acid to an extent sufficient for the above stated function.

An outer abuse layer is provided to isolate the EVOH barrier layer from moisture contact and thereby to prevent degradation in barrier properties. The abuse layer is composed preferably of an ethylene homopolymer or copolymer, generally similar to the material of the foregoing shrink layer. More preferably, the abuse layer is composed of ethylene-vinyl acetate copolymer having a vinyl acetate content of about 5–12%, most preferably about 6%. Alternatively, the outer abuse layer may be the same as the sealing layer, this configuration being appropriate for form/fill/seal packaging wherein heat sealing is done on overlapped edge portions of a sheet of film.

The films according to the present invention exhibit excellent resistance to delamination and while the present invention is not to be limited to any particular theory concerning this superior resistance to delamination, it is believed that by irradiating the fully coextruded structure some measure of cross-linking across the interfaces of the various layers occurs. When the layers have been melt joined in the coextrusion process, there is a measure of intermingling of the melts at the layer interfaces. Thus, it is theorized that molecules from one layer are cross-linked with those in an adjacent layer to some extent during irradiative treatment. Additionally, it is believed that cross-linking accounts for an increase in viscosity, the beneficial effect being realized upon the multilayer components being heated into their respective softening ranges.

The resins or basic polymeric materials fed into the extruders to make the tubular film of the present invention are widely available and can be purchased from any of a number of suppliers, for example those identified in trade publications such as *Modern Plastics Encyclopedia*.

In the data table, a number of examples are presented. Bags were prepared of the various film types indicated in the table by conventional methods substantially as described above. In those examples having six layers, each composite structure is presented beginning with a sealing layer, then a shrink layer, then an adhesive layer, then a barrier layer, then another adhesive layer, and then an outer abuse layer. In those structures having five layers, the structure is presented in the same order except that the fifth layer is an outer abuse layer. The film samples had multilayer dimensions prior to orientation of about 5.5 mils for the sealing layer, about 5.5 mils for the shrink layer, about 0.75 mil for the first adhesive layer, about 1 mil for the barrier layer, about 0.75 mil for the second adhesive layer when present, and about 6.5 mils for the abuse layer. The various examples were irradiated in an electron beam to the extent indicated under the dosage column stated in megarads (MR). The tubular film samples following irradiation were biaxially oriented corresponding to a stretch ratio of about 10:1 for a final overall film thickness of about 2 mils. Bag samples were filled with water and sealed, then submerged in water at about 95° C. for one hour, corresponding to pasteurizing conditions, or at about 80° C. for 12 hours, corresponding to cook-in conditions, and then allowed to cool to room temperature. The treated bag samples were then inspected for end heat seal breaks, delamination, or cracking, any of which would render the bag type unacceptable for commerical use. Each sample that passed the pasteurizing test is so indicated in the data table as Pass/P under the result column, similarly for cook-in as Pass/C or both as Pass/C,P.

| Film Type | Multilayer Structure | Dosage MR | Service |
|---|---|---|---|
| A | PER/EVA6%/Plexar-3/EVOH/Plexar-3/EVA6% | 6.9 | Pass/C,P |
| B | PER/EVA12%/Plexar-3/EVOH/Plexar-3/EVA6% | 5.0–7.4 | Pass/C,P |
| C | PER/LLDPE/Plexar-3/EVOH/Plexar-3/EVA6% | 6.1 | Pass/C,P |
| D | Surlyn/EVA6%/Plexar-3/EVOH/Plexar-3/EVA6% | 4 | Pass/C |
| E | PER/EVA9%/Plexar-158/EVOH/EVA9% | 5.2–8.8 | Fail/C |
| F | PER/EVA12%/Plexar-3/EVOH/Plexar-3/Plexar-3 | 6.9 | Pass/C,P |

| Film Type | Multilayer Structure | Dosage MR | Service |
|---|---|---|---|
| G | PER/EVA9%/LF500/EVOH/LF500/EVA6% | 6.1 | Pass/C,P |
| H | PER/EVA9%/Plexar-158/EVOH/Plexar-158/EVA6% | 7.4 | Pass/C,P |
| H1 | PER/EVA9%/Plexar-158/EVOH/Plexar-158/EVA6% | 4.2 | Fail/C,P |
| A1 | PER/EVA6%/Plexar-3/EVOH/Plexar-3/EVA6% | 6 | Fail/C,P |

The first four examples A–D present preferred structures with the first three having a sealing layer of propylene-ethylene random copolymer (PER) and rated for cook-in or pasteurizing. The fourth example D has the ionomer Surlyn for the sealing layer and is adapted for those applications requiring adhesion of the sealing layer to a cook-in meat product, this structure being cook-in rated. In example E, having some cook-in delamination, the importance of the second layer of adhesive is indicated by comparision with the first three examples. In example F, an alternative approach to abuse protection is indicated, as compared to preferred example D. Although example F passed both cook-in and and pasteurizing the provision of an abuse layer by a thickened additional layer of adhesive is not preferred for economic reasons. In example G, the adhesive LF500, as described above, is substituted for Plexar in the preferred multilayer structures and, as indicated, passed both cook-in and pasteurizing conditions. In the last three examples H, H1, and A1, the effect of irradiation is indicated. Example H is generally a preferred structure (H and H1 differing only in radiation dosage) with about 6 MR being the lower limit for those structures having a PER sealing layer. Example A1, having the same structure as example A, but irradiated to a lesser dosage, had seal failure in both the cook-in and pasteurizing tests.

Although the present invention has been described in conjunction with preferred embodiments, it is to be understood that modifications and variations may be utilized without departing from the principles and scope of the invention, as those skilled in the art will readily understand. Accordingly, such modifications and variations may be practiced within the scope of the following claims:

What is claimed is:

1. A pasteurizable and/or cook-in shrink film, comprising:
   (a) a first or sealing layer which comprises a nonlipophillic polymeric material having a softening point greater than that of the following shrink layer;
   (b) a second or shrink layer, melt bonded to said first layer, which comprises a cross-linked ethylene homopolymer or copolymer, further provided that the thickness of said second layer is sufficient such that the shrink temperature of the entire multilayer film, when oriented, is substantially controlled by the shrink temperature of said second layer;
   (c) a third or adhesive layer, melt bonded to said second layer, which comprises a chemically modified cross-linked polyethylene and having functional groups with a relatively strong affinity for the following barrier layer;
   (d) a fourth or barrier layer, melt bonded to said third layer, which comprises a hydrolyzed cross-linked ethylene-vinyl acetate copolymer;
   (e) a fifth or adhesive layer of substantially the same composition as said third layer, melt bonded to said fourth layer; and
   (f) a sixth or abuse layer comprising a cross-linked polymer, melt bonded to said fifth layer;
   (g) wherein all of said layers of said film are irradiatively cross-linked to an extent corresponding to an irradiation dosage sufficient to increase the resistance of the film layers to delamination under cook-in or pasteurizing conditions but which permits the first layer to function as a sealing layer.

2. The film of claim 1 wherein said film is irradiatively cross-linked to an extent corresponding to a dosage of about 3–12 MR.

3. The film of claim 2 wherein said film is irradiatively cross-linked to an extent corresponding to a dosage of about 6–8 MR.

4. The film of claim 1 wherein said film is oriented.

5. The film of claim 4 wherein said film is biaxially oriented to an extent corresponding to a biaxial free shrinkage at 185° F. of about 30–55%.

6. The film of claim 4 wherein said film prior to orientation has multilayer dimensions of about 2–6/ 4–8/ 0.25–1/ 0.75–2/ 0.25–1/ 3–8 mils, respectively.

7. The film of claim 6 wherein said first layer comprises a propylene-ethylene random copolymer having an ethylene content of about 1–6% by weight.

8. The film of claim 1 wherein said first layer comprises an ionomer characterized as a metal salt neutralized copolymer of ethylene and acrylic acid or methacrylic acid, and said second layer comprises an ethylene-vinyl acetate copolymer having a vinyl acetate content of about 9–12% by weight.

9. The film of claim 1 wherein said second layer comprises an ethylene-vinyl acetate copolymer having a vinyl acetate content of about 12% or less by weight, or low density polyethylene.

10. The film of claim 1 wherein said third layer comprises a blend of a graft copolymer of a high density polyethylene or ethylene-vinyl acetate copolymer and at least one unsaturated fused ring carboxylic acid anhydride with polyethylene, a copolymer of ethylene and an alpha-olefin, or both; or a thallic acid modified low density polyethylene.

11. The film of claim 1 wherein said sixth layer comprises an ethylene homopolymer or copolymer.

12. The film of claim 11 wherein said sixth layer comprises and ethylene-vinyl acetate copolymer having a vinyl acetate content of about 5–12% by weight.

13. The film of claim 1 wherein said sixth layer comprises the same material as said first layer.

* * * * *